(12) United States Patent
Ostuni et al.

(10) Patent No.: US 10,710,893 B2
(45) Date of Patent: Jul. 14, 2020

(54) PROCESS FOR THE SYNTHESIS OF AMMONIA

(71) Applicant: Casale SA, Lugano (CH)

(72) Inventors: Raffaele Ostuni, Lugano (CH);
Ermanno Filippi, Castagnola (CH);
Umberto Rossi, Como (IT)

(73) Assignee: Casale SA, Lugano (CH)

( * ) Notice: Subject to any disclaimer, the term of this patent is extended or adjusted under 35 U.S.C. 154(b) by 126 days.

(21) Appl. No.: 15/545,964

(22) PCT Filed: Jan. 11, 2016

(86) PCT No.: PCT/EP2016/050344
§ 371 (c)(1),
(2) Date: Jul. 24, 2017

(87) PCT Pub. No.: WO2016/120045
PCT Pub. Date: Aug. 4, 2016

(65) Prior Publication Data
US 2018/0002184 A1    Jan. 4, 2018

(30) Foreign Application Priority Data

Jan. 27, 2015 (EP) .................................. 15152699

(51) Int. Cl.
*C01C 1/04* (2006.01)
*C01B 3/02* (2006.01)
(Continued)

(52) U.S. Cl.
CPC ............ *C01C 1/0452* (2013.01); *C01B 3/025* (2013.01); *C01B 3/382* (2013.01); *C01B 3/48* (2013.01);
(Continued)

(58) Field of Classification Search
CPC ....... C01C 1/0452; C01C 1/0417; C01B 3/48; C01B 3/382; C01B 3/025;
(Continued)

(56) References Cited

U.S. PATENT DOCUMENTS

| 3,743,699 | A |   | 7/1973 | Bogart |              |
|-----------|---|---|--------|--------|--------------|
| 3,947,551 | A | * | 3/1976 | Parrish | ............... C01B 3/025 |
|           |   |   |        |         | 423/359 |
| 4,696,799 | A |   | 9/1987 | Noe |              |
| 4,725,380 | A | * | 2/1988 | Pinto | ............... C01B 3/025 |
|           |   |   |        |        | 252/376 |
| 5,110,559 | A | * | 5/1992 | Kondo | ............... B01J 8/025 |
|           |   |   |        |        | 422/109 |
| 5,324,452 | A |   | 6/1994 | Allam et al. |              |

(Continued)

FOREIGN PATENT DOCUMENTS

| CN | 1057627 A | 1/1992 |
| CN | 1082508 A | 2/1994 |

(Continued)

OTHER PUBLICATIONS

International Search Report issued in connection with PCT/EP2016/050344.

(Continued)

*Primary Examiner* — Anthony J Zimmer
(74) *Attorney, Agent, or Firm* — Akerman LLP

(57) ABSTRACT

Process for the synthesis of ammonia comprising the steps of reforming of a hydrocarbon feedstock into a raw product gas, purification of said raw product gas obtaining a make-up synthesis gas, conversion of said synthesis gas into ammonia; said purification includes shift conversion of carbon monoxide into carbon dioxide and the reforming process requires a heat input which is at least partially recovered from at least one of said step of shift conversion, which is carried out with a peak temperature of at least 450° C., and said step of conversion into ammonia.

10 Claims, 3 Drawing Sheets

(51) Int. Cl.
*C01B 3/48* (2006.01)
*C01B 3/38* (2006.01)

(52) U.S. Cl.
CPC ...... *C01C 1/0417* (2013.01); *C01B 2203/025* (2013.01); *C01B 2203/0233* (2013.01); *C01B 2203/0244* (2013.01); *C01B 2203/0283* (2013.01); *C01B 2203/0288* (2013.01); *C01B 2203/0445* (2013.01); *C01B 2203/068* (2013.01); *C01B 2203/0838* (2013.01); *C01B 2203/0883* (2013.01); *C01B 2203/1235* (2013.01); *C01B 2203/1241* (2013.01); *C01B 2203/142* (2013.01); *Y02P 20/129* (2015.11); *Y02P 20/52* (2015.11)

(58) Field of Classification Search
CPC ...... C01B 2203/1235; C01B 2203/142; C01B 2203/0283; C01B 2203/1241; C01B 2203/0883; C01B 2203/0838; C01B 2203/068; C01B 2203/0445; C01B 2203/0288; C01B 2203/025; C01B 2203/0244; C01B 2203/0233; Y02P 20/52; Y02P 20/129
See application file for complete search history.

(56) References Cited

U.S. PATENT DOCUMENTS

| | | |
|---|---|---|
| 6,946,494 B2 | 9/2005 | Filippi et al. |
| 7,172,743 B2 | 2/2007 | Ungar et al. |
| 8,545,727 B2 | 10/2013 | Filippi et al. |
| 9,260,303 B2 | 2/2016 | Filippi et al. |
| 9,810,104 B2 | 11/2017 | Filippi et al. |
| 10,087,074 B2 | 10/2018 | Filippi et al. |
| 2013/0023707 A1* | 1/2013 | Keefer ............... C01B 3/38 585/312 |
| 2013/0345324 A1* | 12/2013 | Knudsen ............ C01B 3/382 518/702 |

FOREIGN PATENT DOCUMENTS

| | | |
|---|---|---|
| EP | 0112613 A2 | 7/1984 |
| EP | 0212889 A2 | 3/1987 |
| EP | 2065337 A1 | 6/2009 |
| WO | 2010/065202 A1 | 6/2010 |

OTHER PUBLICATIONS

International Preliminary Report on Patentability issued in connection with PCT/EP2016/050344.

* cited by examiner

PROCESS FOR THE SYNTHESIS OF AMMONIA

This application is a national phase of PCT/EP2016/050344, filed Jan. 11, 2016, and claims priority to EP 15152699.3, filed Jan. 27, 2015, the entire contents of both of which are hereby incorporated by reference.

FIELD OF APPLICATION

The invention relates to a process for producing ammonia from a hydrocarbon-containing feedstock, a related plant and a method of revamping of related plants.

PRIOR ART

The synthesis of ammonia involves the reforming of a hydrocarbon-containing feedstock (usually natural gas) into a synthesis gas in a front-end section and the conversion of said synthesis gas into ammonia in a synthesis loop. A process for producing ammonia synthesis gas is described for example in EP 2 065 337.

The reforming of the hydrocarbon-containing feedstock needs a heat input which is provided at least partially by combustion of a suitable fuel, for example by combustion of a portion of input natural gas. For example a common reforming setup comprises a step of primary reforming with steam and a subsequent step of secondary reforming with an oxidant. The secondary reforming can be carried out in an internally fired reformer (autothermal reformer ATR) without the combustion of a fuel while the primary reforming is normally carried out in a fired steam reformer.

Combustion in a reforming furnace has the disadvantages of: polluting the atmosphere, in particular due to emissions of carbon dioxide ($CO_2$) and nitrogen oxides ($NO_x$); consumption of a fuel and related cost; less hydrocarbon feedstock available as process gas when the same is also used as a fuel. Furthermore, revamping of a fired equipment is expensive, which means that a revamping to increase capacity of a front end including a fired reformer is costly.

A feasible alternative to at least partially avoid the above mentioned drawbacks of the fired steam reformers is carrying out the steam reforming in a gas heated reformer (GHR), where heat is furnished by a hot process stream, such as the effluent of a secondary reformer which has a temperature around 700-1000° C. The feedstock (i.e. mixture of hydrocarbons and steam) to the GHR requires to be preheated to high temperatures, similar to the temperatures of primary reformer catalyst tubes. This preheating is achieved in the feedstock pre-heater coils in the convection section and increases the fuel consumption of the reformer.

Moreover, a GHR is expensive due to the use of a hot source having a very high temperature and normally containing significant amounts of carbon monoxide (CO) leading to risk of metal dusting.

High temperatures and high CO partial pressures mean that metal surfaces are subjected to carburization and oxidation reactions, hence to metal dusting with consequent corrosion and shorter life time of the reactor. Metal dusting involves use of costly materials and expensive constructional solutions.

Therefore, the use of a GHR does not solve the above problem. It involves high manufacturing costs which may be justified only in some cases, e.g. when capacity can be increased significantly, for example at least by 30%.

SUMMARY OF THE INVENTION

The invention aims to overcome the aforementioned problems and drawbacks of the prior art.

The aims are reached with a process according to claim 1.

The invention discloses to recover heat which is generated during high-temperature shift (HTS) conversion and/or in the synthesis step, and to use this heat to cover at least partially the need of the reforming process. Hence the heat recovery of the invention may provide the heat for reforming in full or in part.

A preferred way of transferring heat to the reforming process is pre-heating of the mixed feed of a reforming section. The term of mixed feed denotes a mixture of hydrocarbon feed, such as natural gas, and steam which feeds a reforming section.

A mixed feed directed to a reforming section can be heated, according to some embodiments, by passing through one or more heat exchangers. The hot source of said heat exchanger(s) can be wherein the hot source of said heat exchanger(s) is taken from the purification section or the conversion section. For example a heat exchanger may be immersed in a catalytic bed of a shift converter or the hot source may be the effluent of said converter.

The high-temperature shift converts carbon monoxide into carbon dioxide and is typically followed by carbon dioxide removal and optionally methanation. In some embodiments, high-temperature shift may be followed by further steps of shift conversion at a lower temperature.

Heat released by the shift conversion can be recovered directly from a catalytic bed of a shift converter, and/or by cooling a hot shifted gas effluent.

High-temperature shift is generally performed over an iron-based catalyst and at the lowest inlet temperature compatibly with the activity of the HTS catalyst, typically of around 320 to 350° C. The temperature profile of the gas subjected to shift conversion may vary according to the adiabatic or isothermal process. In adiabatic shift conversion, the peak temperature is reached at the outlet of the shift converter, namely at the end of the process. In the so-called isothermal shift conversion, the temperature is controlled around a desired value by a heat exchanger immersed in the catalytic bed. Hence the peak temperature is normally reached inside the catalytic bed.

The temperature increase achieved over the HTS catalyst depends, among other things, on the reforming process and reforming operating parameters. For example, the HTS of a reforming process based on the use of stoichiometric air has a higher adiabatic temperature increase than a process with air in excess, but lower than a process using enriched air or oxygen (assuming the same HTS inlet temperature).

In the prior art of HTS, said peak temperature is around 400-420° C. An aspect of the invention is to increase said peak temperature to at least 450° C. This is achieved by increasing the HTS inlet temperature. As a consequence, the invention increases the amount and the temperature of heat recoverable from the shift conversion allowing effective pre-heating of the mixed feed and, in some embodiments, the installation of a pre-reformer.

The increase of the inlet and peak temperatures of the shift conversion goes against the teaching of the prior art, since shift conversion is an exothermic reaction limited by equilibrium which is favored at lower temperatures. Hence, a higher temperature is known to negatively affect the conversion of CO to CO2 and to reduce the hydrogen production. Furthermore, unreacted CO leads to formation of an increased amount of methane in the methanation step. The applicant has found, however, that the above drawbacks are largely overcompensated by the benefit of more heat transferred to the reforming process.

In some embodiments, heat is recovered from the synthesis of ammonia and transferred to the reforming process, for example by heating the mixed feed as mentioned above. When synthesis of ammonia takes place in a cascade of catalytic beds in series, heat is preferably recovered from the effluent of the first bed, which has the highest temperature.

The ammonia synthesis reaction typically occurs in such temperature range that the peak temperature is in the range 400-550° C.

The mixed feed may be heated with the effluent of an ammonia synthesis bed or ammonia synthesis reactor.

In one embodiment of the invention, the mixed feed, prior to reforming, is preheated with a recovered heat and said recovered heat for preheating the mixed feed comes exclusively from cooling of an effluent of a high-temperature shift. Preferably, said effluent has a temperature after the high temperature shift of at least 450° C.

Another preferred feature of the invention is the provision of a pre-reforming step, before the reforming section. According to the invention, the mixed feed is preheated to an adequate temperature for pre-reforming, hence the mixed feed is sent directly to the pre-reformer without any significant further preheating.

According to some embodiments, reforming is a two-stage process comprising a primary reforming with steam (i.e. steam reforming), and a secondary reforming with an oxidant stream. According to other embodiments, reforming is carried out in one step within an auto-thermal reformer (ATR) being fed with steam and an oxidant stream. The oxidant stream of secondary reformer or of ATR is for example air, oxygen or enriched air. Reforming may also include a gas heated reformer (GHR).

In some embodiments of the invention, at least part of the heat input to the reforming is also recovered from the methanation. For example a mixed feed of reforming may be heated by heat exchange within a methanator or with the hot effluent of a methanator.

The reforming mixed-feed may have a high temperature (e.g. close to 400° C.). making it unsuitable for cooling the HTS reactor. In such cases, the mixed-feed is advantageously cooled by exchanging heat with another process stream, for example with the fresh natural gas feed before desulphurization. Then, the cooled mixed feed is re-heated by cooling the HTS reactor or the effluent thereof.

An advantage of the above technique is less fuel consumption of the furnace of the desulphurization section. A further advantage is a better cooling of the HTS reactor and subsequent higher CO conversion for isothermal HTS reactor.

It is to be noted that heating of the mixed feed by means of heat recovered from the shift converter has a pinch point (smallest difference of temperature between hot medium and cold medium) on the hot side, namely mixed feed outlet. It follows that the mixed feed can be heated to a maximum temperature dictated substantially by the temperature of the hot source, and little or no influenced by the inlet temperature of the mixed feed. Hence, a previous cooling of reforming mixed feed, such as the above disclosed heat exchange with the fresh natural gas, does not affect the temperature of the mixed feed actually directed to the reforming process.

In some embodiments, the fresh natural gas feeding said desulphurization section can be heated by heat exchange with the effluent of the HTS reactor. A fresh gas preheater, according to this embodiment, is preferably installed downstream the mixed-feed heater. The fresh gas input is normally split into fuel gas for the furnaces of the plant (e.g. of the primary reformer) and process gas to be reformed.

Advantageously, the full amount of natural gas is preheated according to the present invention, including fuel gas and process gas. Heating the fuel gas allows reducing the fuel consumption of the furnace.

According to some embodiments, the process of the invention is applied in combination with a GHR. In a preferred embodiment, a GHR is installed downstream a secondary reformer; the mixed feed is heated with heat recovered from the shift conversion and/or the synthesis of ammonia thus obtaining a pre-heated mixed feed; the pre-heated mixed feed is then split into two portions, a first portion is sent to the primary reformer and a second portion is sent directly to the GHR, bypassing the first and secondary reformers. Optionally, the pre-heated mixed feed is processed in a pre-reformer before the split.

An advantage is that the reforming process is debottlenecked, because part of the heat required for the reforming is provided by the process of the invention. For example, the duty of either the primary reformer or the GHR can be reduced. Reducing the GHR duty means operating in safer conditions with respect to metal dusting, i.e. operating at higher metal temperatures. Metal dusting is known to occur in a range of temperature comprised between 400° C. and 800° C., in the presence of CO, and it is most severe in the 500-700° C. range. Unloading the GHR may enable increasing the metal temperature thereby reducing the metal dusting risk, without impacting the capacity increase).

The invention also relates to a plant and a method of revamping an existing ammonia plant, according to the claims.

A method of revamping according to the invention provides the installation of one or more heat recovery means, such as heat exchangers, to transfer heat from a shift converter or from a synthesis reactor, to a reforming section. To this purpose, the method of the invention may provide the installation of one or more heat exchangers. More particularly, the method of the invention may provide the installation of one or more heat exchangers outside the existing vessels, or immersed in the catalytic beds of the existing vessels. Said vessels may include shift converters and/or synthesis reactors.

Revamping of a plant comprising an adiabatic shift converter can include the installation of a heat exchanger acting as a mixed feed heater, having the effluent of the shift converter as the hot source. If possible, this heat exchanger is preferably installed inside the pressure vessel of the existing shift converter. Accordingly, the temperature of the hot shifted gas in contact with the walls of the pressure vessel and the related thermal stress are reduced. This solution may be adopted also for new plants.

Another way of carrying out the invention is to install a heat exchanger inside the shift converter and in contact with the catalyst, to receive heat directly from the catalytic bed. In such a case, the adiabatic shift converter is transformed to a substantially isothermal converter.

Similar embodiments can be applied also to heat recovery from a synthesis reactor, e.g. a mixed feed heater can be installed after a synthesis reactor or as in intermediate heat exchanger between a generic first catalytic bed and a subsequent catalytic bed of a synthesis reactor, or between two separate catalytic reactors in series.

In all the embodiments of the invention, the referred shift converter is preferably a high-temperature shift converter (HTS) operating with an iron-based catalyst.

A significant advantage of the invention is the ability to increase the reforming capacity, hence the amount of syngas produced, without consuming more fuel and without introducing further emissions into atmosphere, particularly of CO2, compared to a conventional plant. Furthermore, the invention does not introduce risks of metal dusting. The possibility of increasing the capacity without adding emissions to atmosphere is of particular interest in the field of revamping because it may greatly facilitate the compliance with the applicable laws and, hence, the authorization of the revamping works.

A further advantage is reduction of the duty of the primary reformer and/or the GHR. Still another advantage is that by heating the mixed feed, heat is recovered internally in the process, which is more efficient than the conventional use of heat for the production of steam. A mechanical power shortage due to decreased steam production may be compensated by substituting steam turbines with electrical motors, since electricity may be imported, or produced more efficiently with respect to a steam cycle. It results in reduced fuel consumption.

By heating said mixed-feed in a heat exchanger immersed in a catalytic bed of a shift reactor, according to some embodiments, the following advantages are achieved: concurrent cooling of the catalytic bed of the shift reactor resulting in an increased shift conversion, lower operative temperature at the outlet of the shift reactor, recovery of heat at higher temperature. In some embodiments it is not necessary to further cool the shifted gas leaving said reactor in another mixed feed heater, resulting in less pressure losses of the synthesis gas.

The method of revamping of the invention is particularly useful for increasing the capacity of an existing plant. One of the advantages is that the waste heat boiler which is normally found between the reforming section and the shift converter is unloaded, hence it needs not be revamped or replaced, and in case only slightly modified to meet the temperature requirements of the invention. In fact, increase of the capacity tends to increase the outlet temperature of said boiler, and the teaching of the prior art is to modify the boiler so to maintain substantially the same (or possibly lower) inlet temperature of the shift reactor downstream. In contrast, the invention teaches to increase the working temperature of said shift reactor, which eliminates the need of replacing or substantially modifying the waste heat boiler.

Some embodiments of revamping involve the installation of a pre-reformer. The installation of a pre-reformer is advantageous over prior-art techniques such as the installation of a furnace, which would introduce CO2 emissions, or revamping the existing reformer by adding a convective coil, which would be more expensive. The pre-reformer may be preceded by a trim heater to control the inlet temperature, though the significant preheating to the required prereforming temperature is achieved recovering the heat in the shift or synthesis section according to the invention.

A further embodiment of the method of the invention includes revamping of the synthesis reactor(s) by adding at least a new reactor. An existing plant normally comprises one or more ammonia reactors and the prior art of revamping teaches adding reactors downstream the existing ones.

The method of the invention discloses the addition of one or more reactors upstream the existing ones, and adding a heat exchanger between said newly installed reactor and the existing reactors, said heat exchanger cooling the effluent of the new reactor before admission into the other reactor(s), and heating a mixed feed directed to the reforming section.

By doing so, the invention provides more heat for the pre-heating of the mixed feed at higher temperature. In fact, the first reactor (i.e. catalytic bed) of a cascade of reactors in series (i.e. catalytic beds) reaches the highest outlet temperature, being fed with a more reactive gas with respect to the following reactors.

In some embodiments, a new reactor is installed to receive the make-up gas from the purification section. This newly installed reactor is preferably of the once-through type.

The invention will be further elucidated by the following description of preferred embodiments thereof, given by way of non-limiting examples.

DETAILED DESCRIPTION OF PREFERRED EMBODIMENTS

Figure 1:
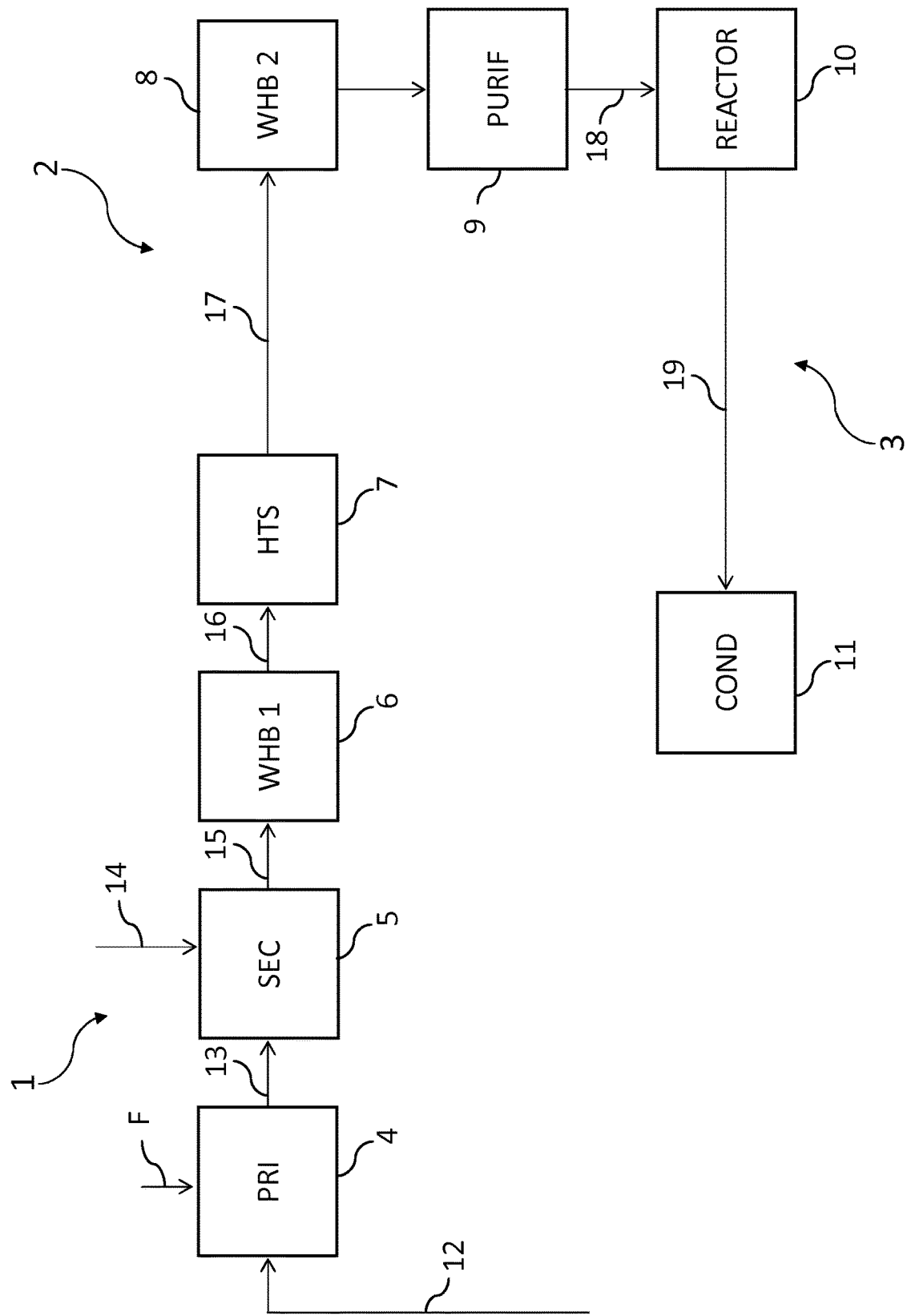
FIG. 1 is a scheme of the plant for the production of ammonia according to the prior art.

FIG. 1 illustrates a block scheme of a plant according to the prior art comprising: a front-end including a reforming section 1 and a purification section 2, providing a make-up synthesis gas, and a synthesis loop 3 for the conversion of said synthesis gas into ammonia.

The reforming section 1 for example comprises a primary reformer 4 and a secondary reformer 5 and a first waste heat boiler 6. The primary reformer 4 is fired by a fuel F, for example natural gas.

The purification section 2 comprises a high-temperature shift reactor 7, a second waste heat boiler 8 and further equipment denoted by block 9. Said block 9 may include one or more of: low-temperature shift reactor (LTS); remover of carbon dioxide, methanator, hot recovery exchangers (e.g. to preheat water), cryogenic purification etc. according to known technique.

The synthesis loop 3 comprises a synthesis reactor 10 and further equipment for processing the effluent of the loop, for example an ammonia condenser 11.

A mixed feed 12 of natural gas and steam is fed to a reformer 4, wherein it is first preheated in one or more mixed feed coils to about 500° C., then reformed in the primary reformer 4 and the effluent 13 is further reformed in the secondary reformer 5 with an oxidant 14 such as air or enriched air or oxygen. The raw product gas 15 leaving the secondary reformer 5 at a temperature of around 900-1000° C. is cooled in the waste heat boiler 6 to a temperature of around 320-350° C. and the cooled gas 16 is fed to the purification section 2, namely to the shift reactor 7.

The effluent 17 of said reactor 7 is cooled in the second waste heat boiler 8 and further purified in the equipment 9 (e.g. by removing CO and CO2) obtaining a make-up gas 18.

Said make-up gas 18 is reacted in the reactor 10 and the ammonia contained in effluent 19 is condensed in block 11.

The mixed feed 12 typically has a temperature around 350° C.

Figure 2:
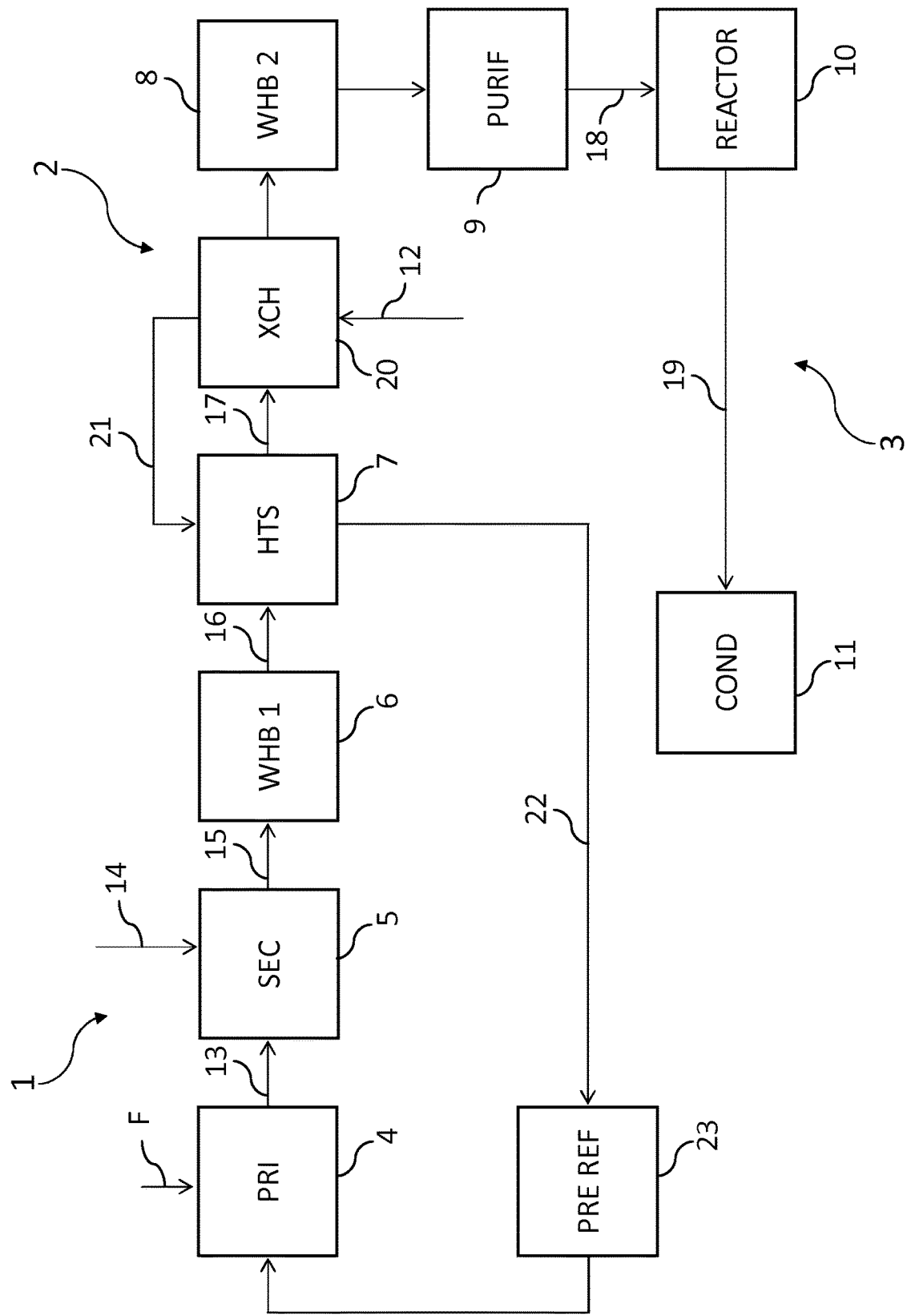
FIG. 2 is a scheme of a plant according to a first embodiment of the invention.

FIG. 2 shows the plant of FIG. 1 revamped according to an embodiment of the invention, where the mixed feed 12 is pre-heated with heat generated by the shift converter 7.

More in detail, an indirect heat exchanger 20 is installed between the shift converter 7 and the waste heat boiler 8. One side of the exchanger 20 is traversed by the hot effluent 17 of the shift converter 7, and the other side is traversed by the mixed feed 12.

Optionally, the heated mixed feed 21 leaving said heat exchanger 20 is further heated in a second heat exchanger immersed in a catalytic bed of said converter 7, obtaining a further heated mixed feed 22. In this case the shift converter 7 works substantially in isothermal conditions, since the temperature of the respective catalytic bed is controlled by the heat exchange with the mixed feed 21.

In some embodiments, the feed 12 may be directly fed in a heat exchanger immersed in the catalytic bed of the shift converter 7 (i.e. without the exchanger 20).

FIG. 2 shows a preferred embodiment where a pre-reformer 23 is also installed upstream the reforming section 1. Accordingly, the mixed feed 22 is sent to said pre-reformer 23.

The peak temperature of the gas evolving in the shift converter 7 is at least 450° C., according to the invention. The temperature of mixed feed 22 is significantly higher than the temperature of the originally available feed 12, for example at least 400° C. and preferably 450° C. or higher. A trim heater may be installed to control the pre-reformer inlet temperature.

Thanks to the higher temperature of mixed feed input, the consumption of fuel F is reduced.

Figure 3:
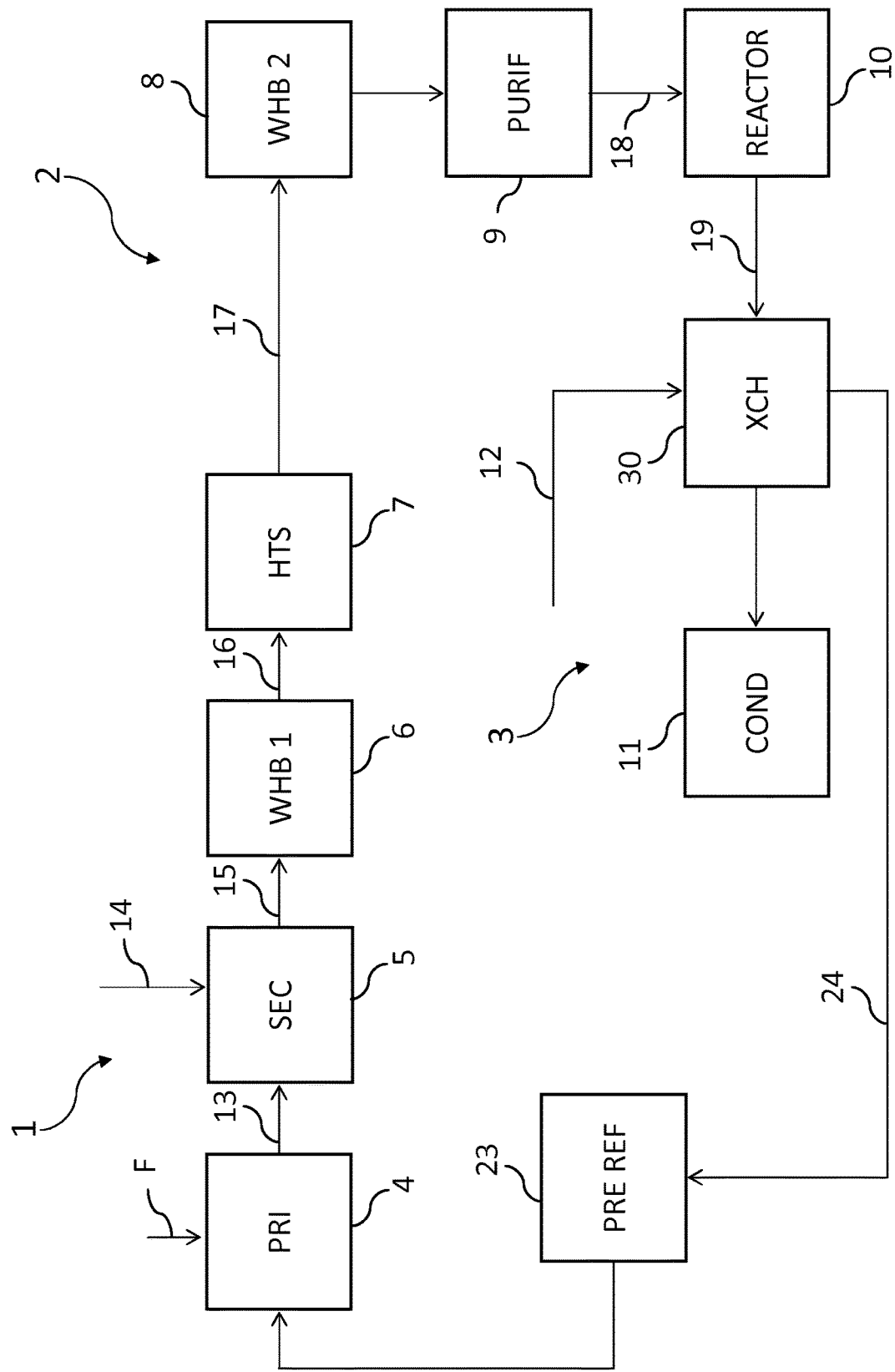
FIG. 3 is a scheme of a plant according to a second embodiment.

FIG. 3 shows another embodiment where heat is recovered from the synthesis loop 3. In this embodiment, the mixed feed 12 is heated in a heat exchanger 30 and the hot source is an effluent 19 of the reactor 10 (or of one of the catalytic beds), obtaining a heated mixed feed 24.

The embodiments of FIGS. 2 and 3 may be combined, for example the heated feed 24 of FIG. 3 may be further heated in the heat exchanger 20 and/or in the shift converter 7 as shown in FIG. 2.

Preferably, the temperature of the stream 16 is also increased, for example from around 320-350° C. to 400° C. or more.

The embodiments of FIGS. 2 and 3 may also be implemented in the realization of new plants.

Some embodiments of the invention involve the revamping of a plant wherein the reforming section includes also a gas-heated reactor (GHR).

For example, an existing plant may include a reforming section with a primary reformer, a secondary reformer and a GHR. Part of the mixed feed is sent to the primary reformer and a remaining part is sent directly to the GHR. According to the method of the invention, the mixed feed is pre-heated in at least one newly installed heat exchanger, using heat recovered from a shift converter and/or from ammonia reactor(s), then a part of the pre-heated mixed feed is sent to the GHR and a remaining part is sent to the primary reformer; in accordance, the original line feeding the GHR can be discontinued. The related advantages are debottlenecking of the primary reformer and/or of the GHR and possible increase of the temperature of the GHR reducing the risk of metal dusting.

The invention claimed is:

1. A process for the synthesis of ammonia comprising the steps of:
    reforming of a hydrocarbon feedstock into a raw product gas, said reforming requiring a heat input;
    purification of said raw product gas obtaining a make-up synthesis gas;
    conversion of said synthesis gas into ammonia, wherein said purification includes shift conversion of carbon monoxide into carbon dioxide, wherein said heat input of the reforming process is at least partially recovered from at least one of:
    said step of shift conversion, which is carried out with a peak temperature of at least 450° C.;
    said step of conversion into ammonia; and
    wherein said heat input of the reforming process is at least partially recovered from the step of conversion into ammonia, and said heat recovery is carried out by: direct cooling of one or more catalytic beds for the synthesis of ammonia, and/or cooling an effluent of an ammonia catalytic bed or ammonia reactor.

2. The process according to claim 1, wherein heat of said shift conversion is recovered by either: direct cooling of a catalytic bed of a related shift converter, and/or cooling an effluent of shifted gas.

3. The process according to claim 1, wherein conversion into ammonia includes the reaction of make-up gas in a plurality of reactors or of catalytic beds in series, and heat is recovered by cooling the effluent of the first of said reactors or catalytic beds, before admission to the subsequent reactors or beds.

4. The process according to claim 1, wherein heat recovered from the shift conversion and/or from synthesis of ammonia is used to pre-heat a mixed feed including hydrocarbon and steam, before admission of said mixed feed to the reforming step.

5. The process according to claim 4, wherein pre-heated mixed feed is subject to pre-reforming before the reforming step.

6. The process according to claim 4, wherein:
    a mixed-feed of natural gas and steam is cooled by exchanging heat with another process stream;
    the so obtained cooled mixed feed is then re-heated by cooling a shift reactor or the effluent thereof.

7. The process according to claim 4, wherein the mixed feed, prior to reforming, is preheated with a recovered heat and said recovered heat comes exclusively from cooling of an effluent of a high-temperature shift.

8. The process according to claim 1, wherein said reforming of the hydrocarbon feedstock comprises: a primary reforming with steam and a secondary reforming with an oxidant and optionally a gas heated reformer ("GHR"), or a step of auto-thermal reforming and optionally a GHR.

9. The process according to claim 6, wherein a mixed-feed of natural gas and steam is cooled by exchanging heat with a fresh natural gas feed before a desulphurization.

10. The process according to claim 7, wherein the mixed feed, prior to reforming, is preheated with a recovered heat and said recovered heat comes exclusively from cooling of an effluent of a high-temperature shift, wherein said effluent has a temperature after the high temperature shift of at least 450° C.

* * * * *